United States Patent
Sisco et al.

(10) Patent No.: US 8,516,818 B2
(45) Date of Patent: Aug. 27, 2013

(54) HIGH ALTITUDE COMBUSTION SYSTEM

(75) Inventors: James Charles Sisco, Nashua, NH (US); Jack Kerrebrock, Lincoln, MA (US); Jeremy Scott Hollman, Quincy, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 13/454,246

(22) Filed: Apr. 24, 2012

(65) Prior Publication Data

US 2012/0204531 A1 Aug. 16, 2012

Related U.S. Application Data

(62) Division of application No. 12/556,202, filed on Sep. 9, 2009, now Pat. No. 8,225,613.

(51) Int. Cl.
*F02C 1/00* (2006.01)
(52) U.S. Cl.
USPC .......................................... 60/723; 60/39.17
(58) Field of Classification Search
USPC .............. 60/723, 777, 218, 219, 39.463, 204; 431/147
See application file for complete search history.

(56) References Cited

U.S. PATENT DOCUMENTS

| | | | | | |
|---|---|---|---|---|---|
| 4,385,489 | A | * | 5/1983 | Abbott | 60/776 |
| 4,578,946 | A | * | 4/1986 | Readman et al. | 60/39.462 |
| 4,731,989 | A | * | 3/1988 | Furuya et al. | 60/775 |
| 5,623,819 | A | * | 4/1997 | Bowker et al. | 60/776 |
| 5,729,967 | A | * | 3/1998 | Joos et al. | 60/39.6 |
| 2003/0205048 | A1 | * | 11/2003 | Hellat | 60/723 |

* cited by examiner

*Primary Examiner* — Gerald L Sung
(74) *Attorney, Agent, or Firm* — Katten Muchin Rosenman LLP

(57) ABSTRACT

A combustion system for performing stable combustion and flame stabilization at high altitudes is described. A primary liquid hydrocarbon fuel is atomized and vaporized within the main combustor chamber to produce a primary fuel vapor. When the combustion system operates at a high altitude, a secondary gaseous fuel is fed into the inlet air port such that the secondary fuel mixes with air, thereby enabling the mixture of the air and the secondary fuel to combust in a catalytic reactor to produce high temperature, oxygen-rich gases that flow into the main combustor chamber. Proper proportional amounts of the two fuels are determined as a function of altitude.

17 Claims, 4 Drawing Sheets

200

100

200

500

HIGH ALTITUDE COMBUSTION SYSTEM

CROSS-REFERENCE TO RELATED APPLICATIONS

This application is a divisional of U.S. patent application Ser. No. 12/556,202, filed Sep. 9, 2009, now U.S. Pat. No. 8,225,613, issued Jul. 4, 2012, the entire contents of which are incorporated herein.

BACKGROUND OF THE INVENTION

1. Field of the Invention

The present invention relates to an air-breathing gas turbine combustor. More particularly, the present invention relates to an air-breathing gas turbine combustor that enables stable combustion over a range of altitudes from sea level to at least 100,000 feet above sea level.

2. Related Art

The present invention provides a novel air breathing gas turbine combustor concept enabling stable combustion over a range of altitudes from sea level to at least 100,000 feet above sea level through the use of two fuel types and catalytic reactor technology. It is well known that conventional gas turbine combustors fueled by liquid hydrocarbons are well characterized and provide high performance and broad flame stability limits at altitudes from sea level up to about 60,000-70,000 feet above sea level. An illustration of an exemplary conventional gas turbine combustor 100 is shown in FIG. 1. A conventional gas turbine combustor design such as that shown in FIG. 1 generally provides high performance and broad flame stability at low altitudes.

However, above these altitudes, for conventional combustors such as that shown in FIG. 1, the combustor operating pressure and air inlet temperature typically drop enough to slow vaporization rates and reaction kinetics such that conventional flame holding techniques are ineffective. This, in turn, causes significant difficulties with respect to flame stabilization. Thus, the present inventors have recognized the need for an improved technique for performing combustion at high altitudes while maintaining flame stability.

SUMMARY OF THE INVENTION

In one aspect, the invention provides a combustion system for performing stable combustion and flame stabilization at high altitudes. The system comprises: a first source for providing a primary liquid hydrocarbon fuel; a second source for providing a secondary gaseous fuel; an inlet air port; a catalytic reactor coupled to the inlet port; a main combustor chamber coupled to the catalytic reactor; and an outlet port coupled to the main combustor chamber. The first source is configured to provide the primary fuel directly into the main combustor chamber such that the primary fuel is atomized and vaporized within the main combustor chamber to produce a primary fuel vapor. When the combustion system operates at an altitude higher than a first predetermined altitude threshold, the combustion system is configured to use the second source to provide the secondary fuel into the inlet air port such that the secondary fuel mixes with air entering the inlet air port, and to cause the mixture of the air and the secondary fuel to combust in the catalytic reactor to produce a gaseous secondary fuel product that flows into the main combustor chamber, such that the main combustor chamber contains a first proportional amount of the primary fuel vapor and a second proportional amount of the gaseous secondary fuel product.

The first predetermined threshold altitude may be greater than or equal to 60,000 feet above sea level. As the altitude at which the combustion system increases from 60,000 feet above sea level to a second predetermined altitude threshold, the first proportional amount may decrease and the second proportional amount may increase. The second predetermined altitude threshold may be greater than or equal to 95,000 feet above sea level.

When the combustion system operates at an altitude higher than the second predetermined altitude threshold, the system may be configured to operate by using the secondary fuel exclusively at altitudes less than or equal to a third predetermined altitude. The third predetermined altitude may be greater than or equal to 110,000 feet above sea level.

The secondary fuel may be produced by decomposition of a monopropellant. The monopropellant may comprise hydrazine. Alternatively, the secondary fuel may be produced by gasification of a pure fuel. The pure fuel may be selected from the group consisting of hydrogen, methane, and propane.

In another aspect, the present invention provides a combustion system for performing stable combustion and flame stabilization at high altitudes. The system comprises: a first source for providing a primary liquid hydrocarbon fuel; a second source for providing a secondary gaseous fuel; an inlet air port; a catalytic reactor coupled to the inlet port; a main combustor chamber coupled to the catalytic reactor; and an outlet port coupled to the main combustor chamber. When the combustion system operates at an altitude lower than a first predetermined altitude threshold, the combustion system is configured to use the first source only to provide the primary fuel directly into the main combustor chamber such that the primary fuel is atomized and vaporized within the main combustor chamber to produce a primary fuel vapor. When the combustion system operates at an altitude higher than the first predetermined altitude threshold, the combustion system is configured to use the second source only to provide the secondary fuel into the inlet air port such that the secondary fuel mixes with air entering the inlet air port, and to cause the mixture of the air and the secondary fuel to combust in the catalytic reactor to produce a gaseous secondary fuel product that flows into the main combustor chamber.

In yet another aspect of the invention, a method for performing stable combustion and flame stabilization at high altitudes is provided. The method comprises the steps of: providing a primary liquid hydrocarbon fuel to a main combustor chamber; atomizing and vaporizing the primary fuel to produce a primary fuel vapor within the main combustor chamber; when an altitude at which the combustion is performed exceeds a first predetermined threshold altitude, providing a secondary gaseous fuel to an inlet air port such that the secondary fuel mixes with air in the inlet air port; and combusting the mixture of air and secondary fuel in a catalytic reactor to produce a gaseous secondary fuel product that flows into the main combustor chamber, such that the main combustor chamber contains a first proportional amount of the primary fuel vapor and a second proportional amount of the secondary fuel vapor.

The first predetermined threshold altitude may be greater than or equal to 60,000 feet above sea level. The step of combusting the mixture of air and secondary fuel in a catalytic reactor may further comprise combusting the mixture of air and secondary fuel in a catalytic reactor to produce a gaseous secondary fuel product that flows into the main combustor chamber, such that the main combustor chamber contains a first proportional amount of the primary fuel vapor and a second proportional amount of the gaseous secondary fuel product and such that as the altitude at which the combustion system increases from 60,000 feet above sea level to a second predetermined altitude threshold, the first proportional amount decreases and the second proportional amount increases. The second predetermined altitude threshold may be greater than or equal to 95,000 feet above sea level.

When the combustion system operates at an altitude higher than the second predetermined altitude threshold, the method may further comprise the step of using the secondary fuel exclusively at altitudes less than or equal to a third predetermined altitude. The third predetermined altitude may be greater than or equal to 110,000 feet above sea level.

The secondary fuel may be produced by decomposition of a monopropellant. The monopropellant may comprise hydrazine. Alternatively, the secondary fuel may be produced by gasification of a pure fuel selected from the group consisting of hydrogen, methane, and propane.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE INVENTION

In order to address the aforementioned shortcomings of conventional gas turbine combustors for high-altitude operation, the present inventors have developed a high-altitude gas turbine engine. As used in conjunction with a preferred embodiment of the present invention, a high-altitude gas turbine engine is referred to as the Hydrazine Decomposition Air Turbine (HDAT). Referring also to U.S. patent application Ser. No. 12/323,820, filed Nov. 26, 2008, the contents of which are incorporated herein in their entirety, the HDAT utilizes a catalytic combustor to facilitate stable combustion of hydrazine decomposition products, composed of gaseous hydrogen and nitrogen at a temperature of 400° F. or higher, with air at high altitudes. Preliminary combustor testing has proved the feasibility of this combustor concept at fuel lean mixture ratios and pressure levels commensurate with altitudes of approximately 95,000 feet above sea level. Further, the present inventors believe that stable combustion using the HDAT system may be achieved at altitudes of up to 110,000 feet above sea level. The HDAT system is also capable of operating at altitudes lower than 65,000 feet above sea level. However, the overall fuel consumption of the HDAT is generally inferior to that of gas turbines fueled by conventional liquid hydrocarbons, which provide good performance at such low altitudes.

Referring generally to FIGS. 2, 3, 4, and 5, in accordance with a preferred embodiment of the present invention, the Extended Altitude Combustion System (EACS) described herein enables a dual fuel gas turbine for which a primary fuel, typically a conventional liquid hydrocarbon such as aviation grade kerosene, serves as the sole fuel source at low altitudes (i.e., under approximately 65,000 feet above sea level). As altitude is increased to a point at which liquid hydrocarbon flame stability begins to deteriorate, a secondary gaseous fuel is supplied to the system. In one preferred embodiment of the invention, the secondary fuel is produced through the decomposition of an appropriate monopropellant, such as hydrazine, or any chemical that has sufficient decomposition energy and suffice heat of combustion with air. In another preferred embodiment of the invention, the secondary fuel is produced through gasification of a pure fuel, such as hydrogen, methane, or propane, or any other gasified pure fuel that has been shown to have high reactivity in the presence of a catalyst at low pressures. The gasification process may be enabled, for example, by a heat exchanger system, or by a throttle valve.

Figure 1:
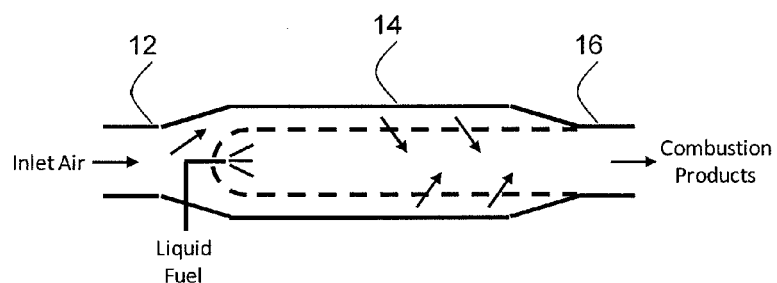
FIG. 1 illustrates a conventional gas turbine combustor.
Figure 2:
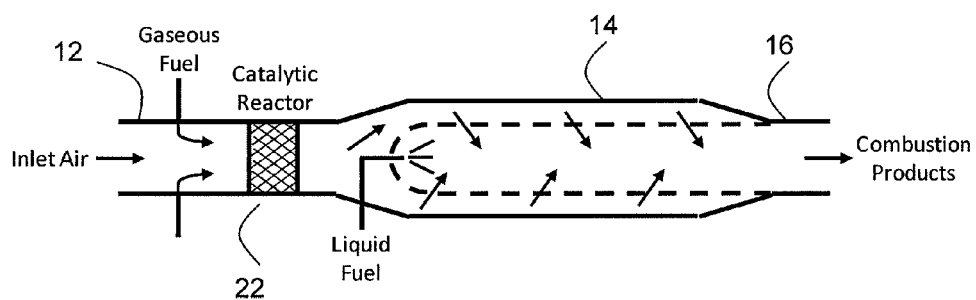
FIG. 2 illustrates a dual fuel gas turbine combustor for performing combustion at high altitudes while maintaining flame stability according to a first preferred embodiment of the present invention.
Figure 3:
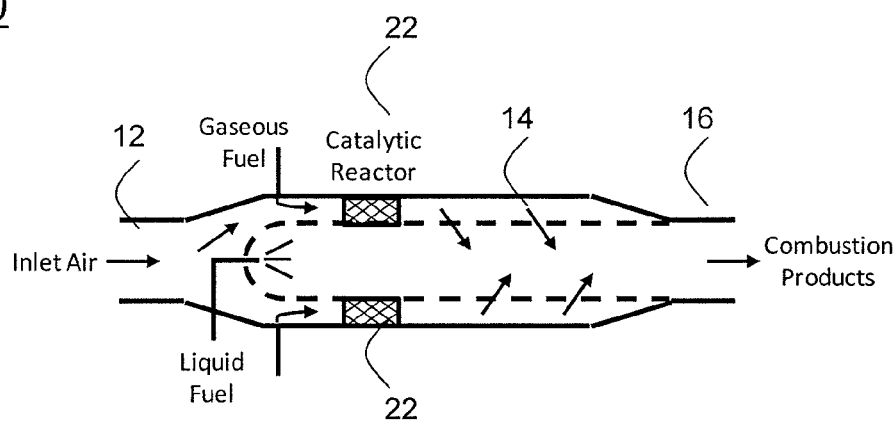
FIG. 3 illustrates a dual fuel gas turbine combustor for performing combustion at high altitudes while maintaining flame stability according to a second preferred embodiment of the present invention.
Figure 4:
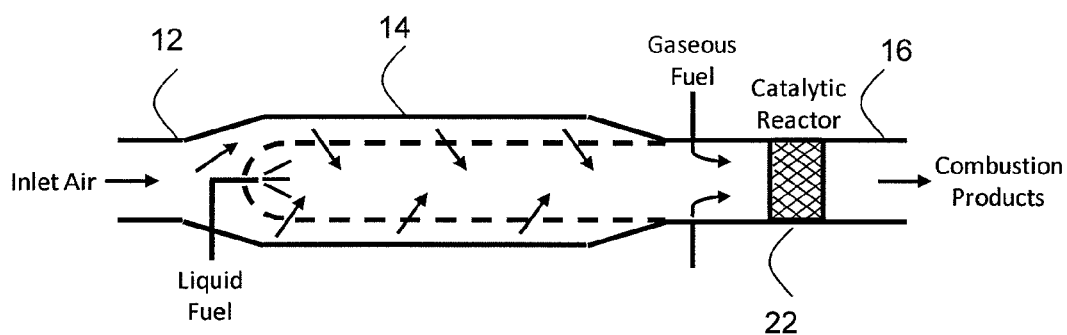
FIG. 4 illustrates a dual fuel gas turbine combustor for performing combustion at high altitudes while maintaining flame stability according to a third preferred embodiment of the present invention.

Referring to FIG. 2, in one exemplary embodiment of a system 200 according to a preferred embodiment of the invention, the secondary gaseous fuel mixes with the compressor air in an inlet air port 12 at a fuel-lean mixture ratio before entering a catalytic reactor 22 of appropriate length, porosity, and material makeup (i.e., washcoat and support). The mixture combusts within the catalytic reactor 22. The resulting high-temperature, oxygen-rich combustion products then enter the main combustor chamber 14, which is otherwise similar to a conventional gas turbine combustor such as that shown in FIG. 1. Within the main combustor chamber 14, the aforementioned combustion products atomize and vaporize the injected liquid fuel (i.e., the primary fuel), mix with the resulting fuel vapor, and react further. This process facilitates increased kinetic rates and consequently broadens the stability limits of the liquid-fueled combustor system 200. As a result, the system 200 is able to maintain the low specific fuel consumption levels commensurate with liquid hydrocarbons at altitudes higher than approximately 65,000 feet above sea level, where operation with these fuels would otherwise be difficult. The system 200 also includes an outlet combustor exhaust duct 16.

As altitude increases further, the system 200 becomes more and more reliant on the secondary fuel flow for combustion stability until eventually a point is reached where combustor pressure has dropped low enough that the primary fuel flow is totally ineffective. At this point, in a preferred embodiment of the present invention, the combustor system 200 is capable of operating solely on the secondary fuel flow and the catalytic reactor 22. In one advantageous application of the present invention, the combustor system 200 provides aircraft with the capability of taking off from the ground and climbing to altitudes of up to 110,000 feet above sea level.

The main combustor chamber 14 may be formed or shaped in a variety of possible modes, depending on operational and geometric constraints. For example, the main combustor chamber 14 illustrated in FIGS. 1 and 2 uses a conventional, through-flow, rich burn-quick quench mix-lean burn (RQL) combustor configuration. However, other widely used variations, such as a lean premixed prevaporized (LPP) combustor or a reverse flow combustor, may also be incorporated into the system according to a preferred embodiment of the invention.

Figure 5:
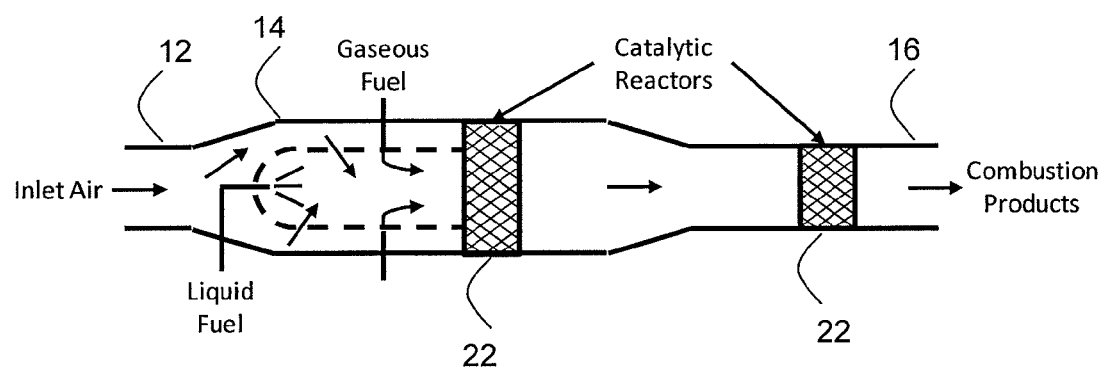
FIG. 5 illustrates a dual fuel gas turbine combustor for performing combustion at high altitudes while maintaining flame stability according to a fourth preferred embodiment of the present invention.

In another preferred embodiment of the present invention, the combustor system may be configured to transition abruptly from the exclusive use of a primary fuel comprising a liquid hydrocarbon fuel to the exclusive use of a secondary gaseous fuel. This alternative configuration offers flexibility with respect to catalytic reactor placement, although most commonly used catalyst materials are susceptible to poisoning by heavy hydrocarbon fuel vapor and thermal degradation when exposed to high temperatures. For example, referring to FIG. 3, in a system 300 according to another preferred embodiment of the present invention, the catalytic reactor 22 may be positioned within the dilution air passage. Alternatively, referring to FIG. 4, in another system 400 according to an exemplary preferred embodiment of the present invention, the catalytic reactor 22 may be positioned downstream of the dilution zone, in the combustor exhaust duct. Referring to FIG. 5, in another alternative system configuration 500 according to yet another preferred embodiment of the present invention, the catalytic reactor 22 may be used in a multiple stage configuration. Typically, the position and configuration of the catalytic reactor 22 will be selected based on a variety of considerations, such as the required size of the catalyst, the thermal tolerances of the catalyst, and system compatibility requirements. The multiple stage configuration of FIG. 5 may be used, for example, in expendable systems with short operational lifetimes, such as gas turbine powered missiles, for which some catalyst degradation may be acceptable.

The method of transition between the primary fuel and the secondary fuel is generally intended to avoid thermal damage to combustor components and also to avoid loss of thrust. In configurations for which the catalytic reactor is positioned downstream of the fuel injection point, such as those illustrated in FIGS. 3, 4, and 5, electromechanically actuated flow diversion devices may be used advantageously to ensure a stable transition.

The altitude at which operation is abruptly transitioned from the primary liquid hydrocarbon fuel to the secondary gaseous fuel is dependent upon the stability limits of the hydrocarbon fuel. Typically, this altitude will be within the range of approximately 50,000 feet above sea level to approximately 70,000 feat above sea level. The selection of the transition altitude is made so as to maximize system performance and utility.

Figure 6:
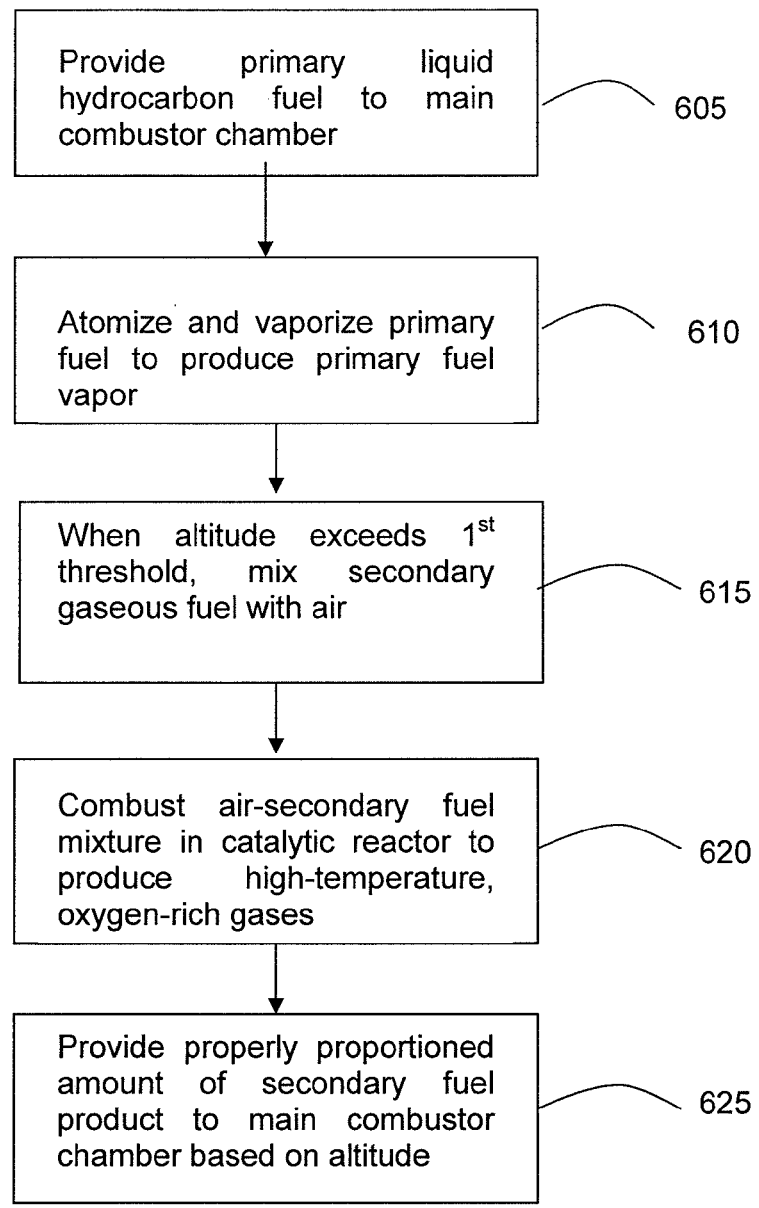
FIG. 6 shows a flow chart for a method of performing high-altitude combustion while maintaining flame stability according to a preferred embodiment of the present invention.

Referring to FIG. 6, a flowchart 600 illustrates a method for performing high-altitude combustion while maintaining flame stability according to a preferred embodiment of the present invention. In the first step 605, a primary liquid hydrocarbon fuel is provided to a main combustor chamber. In the second step 610, the primary fuel is atomized and vaporized to produce a primary fuel vapor within the main combustor chamber.

In the third step 615, when an altitude at which the combustion is performed exceeds a first predetermined threshold altitude, a secondary gaseous fuel is provided to an inlet air port such that the secondary fuel mixes with air in the inlet air port. In the fourth step 620, the mixture of air and secondary fuel is combusted in a catalytic reactor to produce a high-temperature, oxygen-rich gaseous secondary fuel product that flows into the main combustor chamber. In the fifth and final step 625, appropriate proportional amounts of the primary fuel vapor and the high-temperature, oxygen-rich gaseous secondary fuel product are determined based on altitude, and the proper proportional amounts are thereby provided.

While the foregoing detailed description has described particular preferred embodiments of this invention, it is to be understood that the above description is illustrative only and not limiting of the disclosed invention. While preferred embodiments of the present invention have been shown and described herein, it will be obvious to those skilled in the art that such embodiments are provided by way of example only. Numerous variations, changes, and substitutions will now occur to those skilled in the art without departing from the invention.

What is claimed is:

1. A combustion system for performing stable combustion and flame stabilization at high altitudes, comprising:
   a first source for providing a primary liquid hydrocarbon fuel;
   a second source for providing a secondary monopropellant fuel;
   an inlet air port;
   a catalytic reactor coupled to the inlet port;
   a main combustor chamber coupled to the catalytic reactor; and
   an outlet port coupled to the main combustor chamber,
   the first source being configured to provide the primary fuel directly into the main combustor chamber such that the primary fuel is atomized and vaporized within the main combustor chamber to produce a primary fuel vapor,
   wherein, when the combustion system operates at an altitude higher than a first predetermined altitude threshold, the combustion system is configured (i) to use the second source to provide the secondary monopropellant fuel into the inlet air port such that the secondary monopropellant fuel mixes with air entering the inlet air port, and (ii) to cause the mixture of the air and the secondary monopropellant fuel to combust in the catalytic reactor to produce a gaseous secondary fuel product that flows into the main combustor chamber, such that the main combustor chamber contains a first proportional amount of the primary fuel vapor and a second proportional amount of the gaseous secondary fuel product.

2. The combustion system of claim 1, wherein the first predetermined threshold altitude is greater than or equal to 60,000 feet above sea level.

3. The combustion system of claim 2, wherein as the altitude at which the combustion system increases from 60,000 feet above sea level to a second predetermined altitude threshold, the first proportional amount decreases and the second proportional amount increases.

4. The combustion system of claim 3, wherein the second predetermined altitude threshold is greater than or equal to 95,000 feet above sea level.

5. The combustion system of claim 3, wherein when the combustion system operates at an altitude higher than the second predetermined altitude threshold, the system is configured to operate by using the secondary monopropellant fuel exclusively at altitudes less than or equal to a third predetermined altitude.

6. The combustion system of claim 5, wherein the third predetermined altitude is greater than or equal to 110,000 feet above sea level.

7. The combustion system of claim 1, the secondary monopropellant fuel comprising hydrazine.

8. A combustion system for performing stable combustion and flame stabilization at high altitudes, comprising:
   a first source for providing a primary liquid hydrocarbon fuel;
   a second source for providing a secondary monopropellant fuel;
   an inlet air port;
   a catalytic reactor coupled to the inlet port and disposed upstream of the first source and downstream of the second source;

a main combustor chamber coupled to the catalytic reactor; and an outlet port coupled to the main combustor chamber, the first source being configured to provide the primary liquid fuel directly into the main combustor chamber such that the primary fuel is atomized and vaporized within the main combustor chamber to produce a primary fuel vapor, wherein, when the combustion system operates at an altitude higher than a first predetermined altitude threshold, the combustion system is configured (i) to use the second source to provide the secondary monopropellant fuel into the inlet air port such that the secondary monopropellant fuel mixes with air entering the inlet air port, and (ii) to cause the mixture of the air and the secondary monopropellant fuel to combust in the catalytic reactor to produce a gaseous combustion fuel product that flows into the main combustor chamber where it atomizes and vaporizes the injected primary liquid fuel, such that the main combustor chamber contains a first proportional amount of primary fuel vapor and a second proportional amount of the gaseous combustion fuel product.

9. The combustion system of claim 8, wherein the first predetermined threshold altitude is greater than or equal to 60,000 feet above sea level.

10. The combustion system of claim 9, wherein as the altitude at which the combustion system increases from 60,000 feet above sea level to a second predetermined altitude threshold, the first proportional amount decreases and the second proportional amount increases.

11. The combustion system of claim 10, wherein the second predetermined altitude threshold is greater than or equal to 95,000 feet above sea level.

12. The combustion system of claim 10, wherein when the combustion system operates at an altitude higher than the second predetermined altitude threshold, the system is configured to operate by using the secondary monopropellant fuel exclusively at altitudes less than or equal to a third predetermined altitude.

13. The combustion system of claim 12, wherein the third predetermined altitude is greater than or equal to 110,000 feet above sea level.

14. The combustion system of claim 8, wherein the gaseous combustion fuel product is produced by decomposition of a monopropellant.

15. The combustion system of claim 14, the monopropellant comprising hydrazine.

16. The combustion system of claim 8, wherein the gaseous combustion fuel product is produced by gasification of a pure fuel.

17. The combustion system of claim 16, the pure fuel being selected from the group consisting of hydrogen, methane, and propane.

* * * * *